United States Patent
Wang

(10) Patent No.: US 11,223,484 B1
(45) Date of Patent: *Jan. 11, 2022

(54) ENHANCED AUTHENTICATION METHOD FOR HADOOP JOB CONTAINERS

(71) Applicant: EMC IP Holding Company LLC, Hopkinton, MA (US)

(72) Inventor: Dong Wang, Scarborough (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/802,382

(22) Filed: Feb. 26, 2020

Related U.S. Application Data

(63) Continuation of application No. 15/723,418, filed on Oct. 3, 2017, now Pat. No. 10,615,984.

(51) Int. Cl.
| | |
|---|---|
| G06F 21/52 | (2013.01) |
| H04L 29/06 | (2006.01) |
| H04L 9/32 | (2006.01) |
| H04L 9/08 | (2006.01) |
| G06F 9/48 | (2006.01) |
| H04L 9/14 | (2006.01) |
| G06F 16/182 | (2019.01) |
| G06F 11/14 | (2006.01) |

(52) U.S. Cl.
CPC .......... *H04L 9/3247* (2013.01); *G06F 9/4843* (2013.01); *G06F 16/182* (2019.01); *H04L 9/0861* (2013.01); *H04L 9/14* (2013.01)

(58) Field of Classification Search
CPC ......... H04L 67/10; H04L 9/14; H04L 9/0861; H04L 9/3247; H04L 9/0643; H04L 9/3236; H04L 9/3242; G06F 9/5066; G06F 9/4843; G06F 11/1435; G06F 16/1752; G06F 16/182
See application file for complete search history.

(56) References Cited

U.S. PATENT DOCUMENTS

| | | | |
|---|---|---|---|
| 8,706,798 B1 * | 4/2014 | Suchter | H04L 43/0876 709/202 |
| 8,849,891 B1 * | 9/2014 | Suchter | H04L 43/08 709/202 |
| 9,652,487 B1 * | 5/2017 | Patiejunas | G06F 11/1004 |

(Continued)

OTHER PUBLICATIONS

Cohen, Jason C., and Subrata Acharya. "Towards a trusted HDFS storage platform: Mitigating threats to Hadoop infrastructures using hardware-accelerated encryption with TPM-rooted key protection." Journal of information security and applications 19.3 (2014): 224-244. (Year: 2014).*

(Continued)

*Primary Examiner* — Michael Simitoski
(74) *Attorney, Agent, or Firm* — Staniford Tomita LLP

(57) ABSTRACT

Embodiments for providing content authentication of data in a network having a name node and a data node which may be in a Hadoop Distributed File System (HDFS) network, by associating each data set of the data with a first key identifying a job owner issuing a task for the data set, the first key being a session key that is randomly generated for the task, generating a second identity value for the data set on the data node, and performing the task if the second identity value matches the first key.

18 Claims, 6 Drawing Sheets

(56) References Cited

U.S. PATENT DOCUMENTS

| | | | |
|---|---|---|---|
| 10,162,978 B2* | 12/2018 | Sun | H04L 9/083 |
| 2006/0005031 A1* | 1/2006 | Apostolopoulos | H04L 9/0637 |
| | | | 713/179 |
| 2013/0041872 A1* | 2/2013 | Aizman | G06F 16/182 |
| | | | 707/690 |
| 2013/0138966 A1* | 5/2013 | Tagashira | H04L 9/3242 |
| | | | 713/179 |
| 2013/0226978 A1* | 8/2013 | Bestler | G06F 16/1752 |
| | | | 707/827 |
| 2013/0232503 A1* | 9/2013 | Volvovski | G06F 9/50 |
| | | | 718/104 |
| 2014/0136779 A1* | 5/2014 | Guha | H04L 67/10 |
| | | | 711/114 |
| 2014/0229455 A1* | 8/2014 | Bestler | G06F 16/22 |
| | | | 707/695 |
| 2014/0245390 A1* | 8/2014 | Clay | H04L 9/3273 |
| | | | 726/3 |
| 2015/0006716 A1* | 1/2015 | Suchter | H04L 43/0876 |
| | | | 709/224 |
| 2015/0143063 A1* | 5/2015 | Mutalik | G06F 11/1451 |
| | | | 711/162 |
| 2015/0143064 A1* | 5/2015 | Bhargava | G06F 11/1451 |
| | | | 711/162 |
| 2017/0083716 A1* | 3/2017 | Sun | H04L 9/0894 |
| 2017/0323114 A1* | 11/2017 | Egorov | H04L 9/0618 |
| 2019/0089720 A1* | 3/2019 | Aditham | H04L 63/0442 |

OTHER PUBLICATIONS

Khalil, Issa, Zuochao Dou, and Abdallah Khreishah. "TPM-based Authentication Mechanism for Apache Hadoop." 2014. (Year: 2014).*

Yu, Xianqing, Peng Ning, and Mladen A. Vouk. "Enhancing security of Hadoop in a public cloud." 2015 6th International Conference on Information and Communication Systems (ICICS). IEEE, 2015. (Year: 2015).*

* cited by examiner

ENHANCED AUTHENTICATION METHOD FOR HADOOP JOB CONTAINERS

CROSS-REFERENCE TO RELATED APPLICATION

This application is a Continuation Application of U.S. patent application Ser. No. 15/723,418, filed on Oct. 3, 2017, which is incorporated herein by reference for all purposes.

TECHNICAL FIELD

Embodiments are generally directed to network security and user authentication, and more specifically to authenticating files in a Hadoop file system.

BACKGROUND

The Hadoop Distributed File System (HDFS) is a software framework for distributed storage and processing of big data on clusters of machines. The HDFS splits large files into large blocks, such as of size 64 MB or 128 MB, and distributes the blocks among nodes in a cluster. An associated programming model, such as MapReduce can be used to perform data processing, such as filtering and sorting the large data sets in parallel on a cluster.

HDFS is structured similarly to a regular Unix filesystem except that data storage is distributed across several machines. It provides a filesystem-like layer for large distributed systems to use. It has in built mechanisms to handle machine outages, and is optimized for throughput rather than latency. There are three main types of machines in a HDFS cluster: a name node or master machine that controls all the metadata for the cluster, a data node where HDFS actually stores the data (a cluster has multiple data nodes), and a secondary namenode that keeps a copy of edit logs and a filesystem image, merging them periodically to minimize the image size. Data in HDFS can be accessed using either the Java API (application programming interface), or the Hadoop command line client. HDFS is optimized differently than a regular file system, as it is designed for non-real-time applications demanding high throughput, instead of online applications demanding low latency.

In a Hadoop system, there are generally three stages for accomplishing user submitted jobs. In stage 1, a service subscriber submits the job to the entry point of the service provider through a communication channel. In stage 2, the server allocates resources to schedule the job based on the service grade of the subscriber and availability of the system. In stage 3, the job gets distributed to the cluster in a job container and is executed in massively parallel processes.

An important aspect of maintaining the integrity of the HDFS is proper user authentication. The present version of Hadoop uses Kerberos to conduct user authentication. Kerberos is a network authentication protocol that works on the basis of tickets to allow nodes communicating over a non-secure network to securely prove their identity to others in the network. When a user submits a job, their Kerberos principal is validated with a ticket-granting ticket, which is issued by the key distribution server.

Modern implementations of Hadoop use a cluster management technology known as YARN, which acts as a system for managing distributed applications. A resource master manages resources available on a single node by acting as a scheduler that arbitrates among cluster resources. For job authentication, due to functionality and performance reasons, the application Master of the Yarn uses a delegation token to get itself authenticated by a region manager. To check the file integrity, Hadoop provides services that use Cyclic Redundancy Check (CRC) for checksums. This type of security check ensures that the content of the file does not get changed during transit within the cluster.

As stated above, in stage 3, Hadoop packages all the job specific files into an execution container (or "job container"), and distributes it to the file system of the node managers for job execution. A Hadoop execution container contains all the job-related files for the application manager to spawn the job. These files are either created by Hadoop by defaults, or user specific files passed in during the job submission, and are all associated with their own CRC checksum for file integrity. Generally, these files are of different in length, and exist in various formats. The current Hadoop mechanism of user authentication is single-pointed, meaning that the authentication is only done at the time of the subscriber's check-in at stage 1. During stage 2 and stage 3, only file integrity and job authentication are checked. However, authentications on the file level do not get checked. This is a big potential problem because a large percentage of security breaches happen within an intranet (e.g., cluster) instead of the Internet.

What is needed, therefore, is a way to improve the content authentication of the job container in the distribution and execution stage of the process in Hadoop file system networks.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
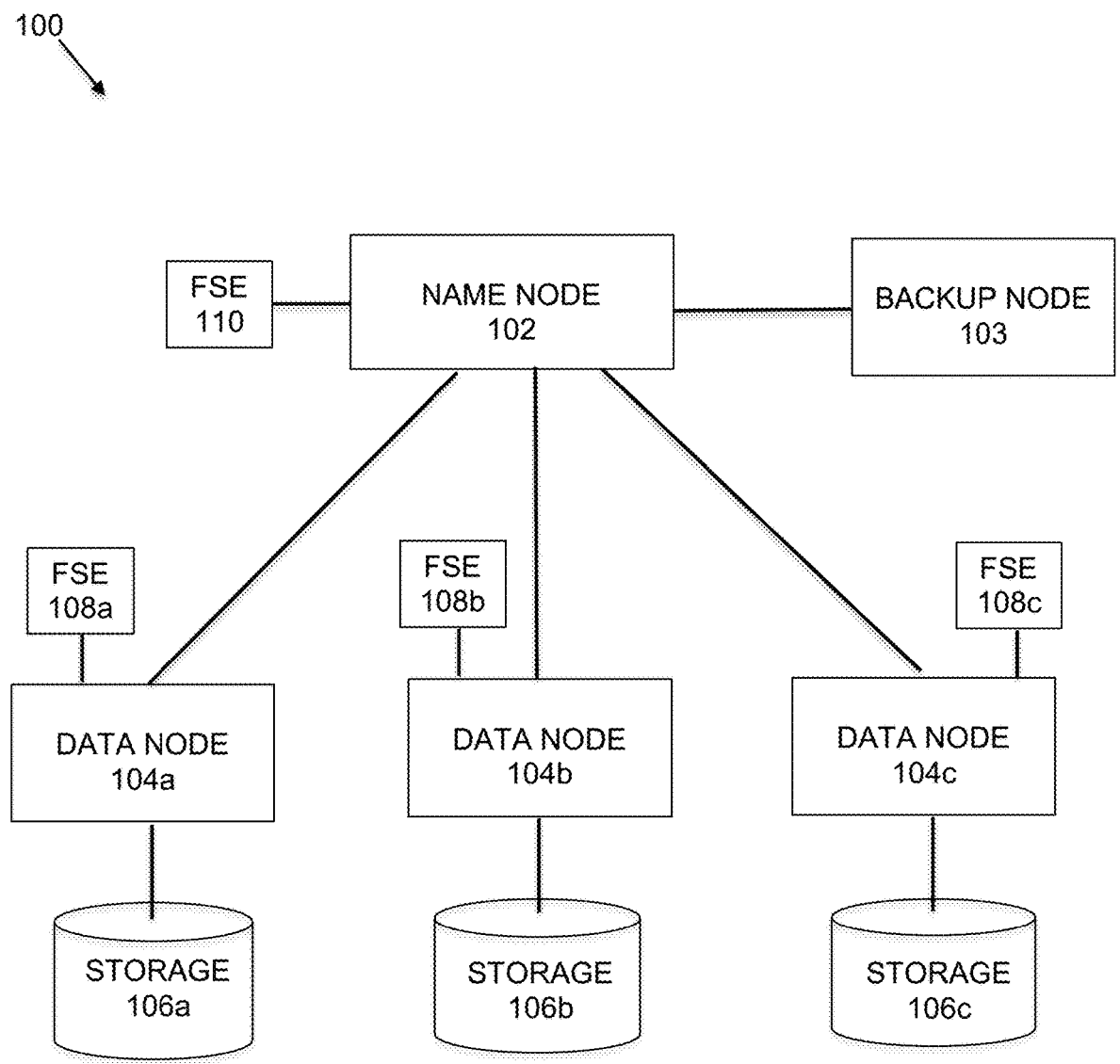
FIG. 1 illustrates a large-scale network system with devices that implement one or more embodiments of a HDFS authentication system, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Embodiments are directed to content authorization of job containers in Hadoop systems. The Hadoop Distributed File System (HDFS) is a distributed file system designed to hold very large volumes of data (e.g., on the order of terabytes or petabytes). Conceptually, HDFS is a block-structured file system where individual files are broken into blocks of a fixed size, these blocks are then stored across a cluster of one or more machines with data storage capacity. The individual machines in the cluster are referred to as data nodes, and HDFS is responsible for distributing the data across the data nodes. It performs the administrative tasks, such as addition of the nodes to a cluster, removal of the nodes from the cluster, and recovery of data nodes in the event of failure.

FIG. 1 illustrates an HDFS system that implements an enhanced authentication method, under some embodiments. The main components of system 100 are name node 102, data nodes 104*a-c* and backup node 103. As can be seen in FIG. 1, HDFS system 100 has a master/slave architecture. An HDFS cluster consists of a single name node, a master server that manages the file system namespace and regulates access to files by clients. The name node 102 is thus the administrator/master of the system, and manages the data blocks that are present on the data node. The name node stores the metadata and it runs it on the hardware, and is the single-entry point for any of the failures that may occur in a Hadoop cluster.

The data nodes 104*a-c* are the slaves which are deployed on each machine, and are the place where actual data is stored. A data node is responsible for serving read and write requests for the clients. Each data node holds a part of the overall data and processes the part of the data which it holds. HDFS exposes a file system namespace and allows user data to be stored in files. Internally, a file is split into one or more blocks and these blocks are stored in a set of data nodes. The name node executes file system namespace operations like opening, closing, and renaming files and directories. It also determines the mapping of blocks to data nodes, which are responsible for serving read and write requests from the file system's clients. The data nodes also perform block creation, deletion, and replication upon instruction from the name node.

The backup node 103 is responsible for performing periodic checkpoints so that in the event of name node failure, the system can restart the name node using a checkpoint. Although FIG. 1 illustrates an HDFS system with a certain number of nodes, embodiments are not so limited, and any number of nodes may be used depending on system configuration.

HDFS supports a traditional hierarchical file organization. A user or an application can create directories and store files inside these directories. The file system namespace hierarchy is similar to most other existing file systems in that a user can easily create and remove files, move a file from one directory to another, or rename a file. The name node maintains the file system namespace. HDFS is designed to reliably store very large files across machines in a large cluster. It stores each file as a sequence of blocks; all blocks in a file except the last block are the same size. The blocks of a file are replicated for fault tolerance.

Apache Hadoop YARN (Yet Another Resource Negotiator) is a cluster management technology that is characterized as a large-scale, distributed operating system. YARN combines a central resource manager that reconciles the way applications use Hadoop system resources with node manager agents that monitor the processing operations of individual cluster nodes.

As stated above, current known authentication stay on the user level using a delegation token (Hadoop specific) that is not secure if user files are modified by third party. The current Hadoop mechanism of user authentication is single-pointed so that authentication is only done at the time of the subscriber's check-in at stage 1. During stage 2 and stage 3, only file integrity and job authentication are checked. However, authentications on the file level are not performed. Embodiments described herein overcome this issue through a system and method that targets the methodology of the content authentication of the job container to strengthen this security weakness during job execution in a Hadoop system. Both user and content level authentication are performed, thus eliminating man-in-the-middle and impersonation risks. As shown in FIG. 1, each of the name and data nodes of system 100 executes an encryption program that is built around a file signing engine (FSE). Thus, for the example system 100, name node executes FSE 110 and each data node executes a respective FSE process 108a-c.

Figure 2:
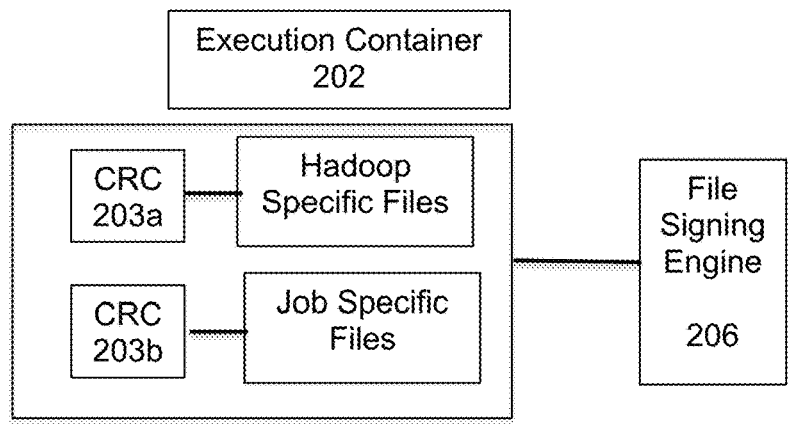
FIG. 2 illustrates a Hadoop execution container that implements a file signature engine component, under some embodiments.

In the HDFS process flow, after the service subscriber submits the job to the entry point of the service provider through a communication channel (stage 1), and the server allocates the resource to schedule the job (stage 2), the job gets distributed to the cluster in a job container (stage 3). FIG. 2 illustrates a Hadoop execution container that implements a file signature engine component, under some embodiments. The terms "job container" and "execution container" are used interchangeably and refer to a resource (e.g., memory) on a single node of a cluster that is supervised by the node manager and scheduled by the resource manager. It is the resource where a YARN application is run, or where the job is executed. Every node in the system comprises multiple containers of a minimum memory size (e.g., 512 MB or 1 GB), and the application master can request any container as a multiple of this memory size.

For the embodiment of FIG. 2, Hadoop packages all the job specific files into an execution container 202, and distributes it to the file system of the node managers for job execution (stage 3 of the process). The execution container 202 contains all the job-related files for the application manager to spawn the job, and the files are either Hadoop-specific or job-specific. As shown in FIG. 2, the files are all associated with their own CRC checksum 203a or 203b for file integrity. This type of protection is adequate to check file integrity and job authentication, however, other breaches, such as in-transit or third-party tampering or corruption are not protected against by simple CRC checks. In an embodiment, the system includes a file signing engine component 206 to check authentications on the file level and to provide content authentication on the job container.

In the embodiment of FIG. 1, a file signing engine (110, 108a-c) is executed on each of the name node and the data nodes that are assigned for the user submitted job, to perform a cryptographic digestion function. In general, a cryptographic digestion function is a message digest or hash function that turns and input of arbitrary length into an output of fixed length, which is called the digest or hash of the input. The function thus implements a mathematical algorithm that maps data of arbitrary size to a bit string of a fixed size, which is designed to be a one-way function that is nearly impossible to invert.

Figure 3:
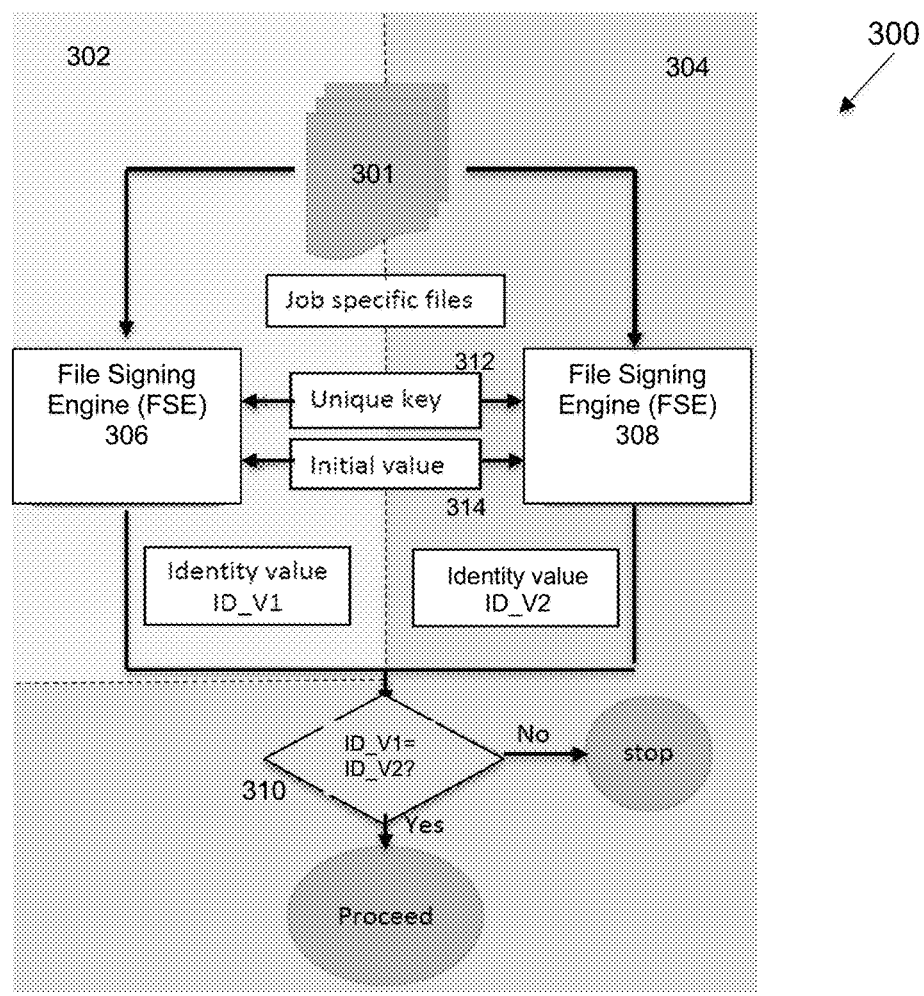
FIG. 3 illustrates a workflow of a file signing engine process for content authentication in an HDFS system, under some embodiments.

FIG. 3 illustrates a workflow of a file signing engine process for content authentication in an HDFS system, under some embodiments. The workflow 300 of FIG. 3 operates both on a name node 302 and a data node 304. The name node executes FSE 306 and the data node executes FSE 308. It should be noted that FSE 306 and 308 represent two instances of the same file system engine process that is executed on both nodes 302 and 304.

Authentication is performed on job specific files 301 that are input to both file signing engines on the name node and data node. At the job submission stage on the name-node, FSE 306 takes in the appropriate job specific files, and generates an identity value ID_V1 for these files. Before the job gets executed on the data node 304, it takes the same set of the files 301 and runs them through FSE 308 on each job execution host, and obtains the identity value as ID_V2. The process then compares the ID_V1 and ID_V2 values in comparison component 310. If the values are the same, the job proceeds. If the values are not the same, there is an indication that the files are corrupt or have been modified, and the job is aborted (stop).

As shown in FIG. 3, the file signing engine (FSE) takes in the set of files 301 in the job container as input, runs them through a cryptographic digestion function with a unique key 312 from the job owner. The digestion function outputs intermediate values as the digested codes. Taking the digested codes, the FSE combines them into a special designed combining function, which also takes in an initial value 314, and outputs the identity value for the set of files that are processed.

In process 300 of FIG. 3, the initial value 314 is one of inputs for the combining function, and it serves as a unique session key to avoid conflict. The initial value is a random value that is generated per job. It is a value represented in a defined bit length, k. In an embodiment, the initial value is generated by the system, and it varies each time the process is initiated. The initial value is used both at the name node and data node. The initial value is passed to a data node from a name node through a transient and secure communication channel. The purpose of using an initial value is to prevent the same user running for the same job at different time ending up with the same output value from the FSE. This is a mechanism to address the global uniqueness of the output of FSE, and also prevent replay attacks.

The unique key 312 is one of inputs for the digestion function, and it is a value to indicate the job owner's identity. It is also in the same bit length, k. The unique key is unique to the user and can be a provided salt value. In an embodiment, the unique key is used as identifier for each Hadoop user. When user submits a job to Hadoop cluster, it is passed to data node through the same channel at the same time, in the same way as the initial value. For example, if User A holds a possession of a Unique Key A, a key generation mechanism is used to generate such a key. This generator can be implemented as one of: (1) a user picked combination of letter, numbers, and special characters; (2) a pseudorandom sequence generator with designed shifting and/or combining logic; (3) a global number counter starting from an initial number increment by a step each time; and/or (4) a time stamp in rigid format. Moreover, these methods can be used in conjunction with each other to provide the generator with a higher level of complexity. In addition, an encode method, or an encryption method can be also added to blend the content of key.

The digested code is an intermediate output generated by the digestion function. It is of bit length of k. The identity value (ID_V1 and ID_V2) identifies each job and is the output value of the FSE, and the signature for the signed files to indicate the unique identity for the files. It is of bit length of k.

In an embodiment, the digestion function takes a file/files in various length and a unique key of length k, and generates a digested code of length k as output. The digestion function can be a cryptographic hash function, or similar encryption process.

Figure 4:
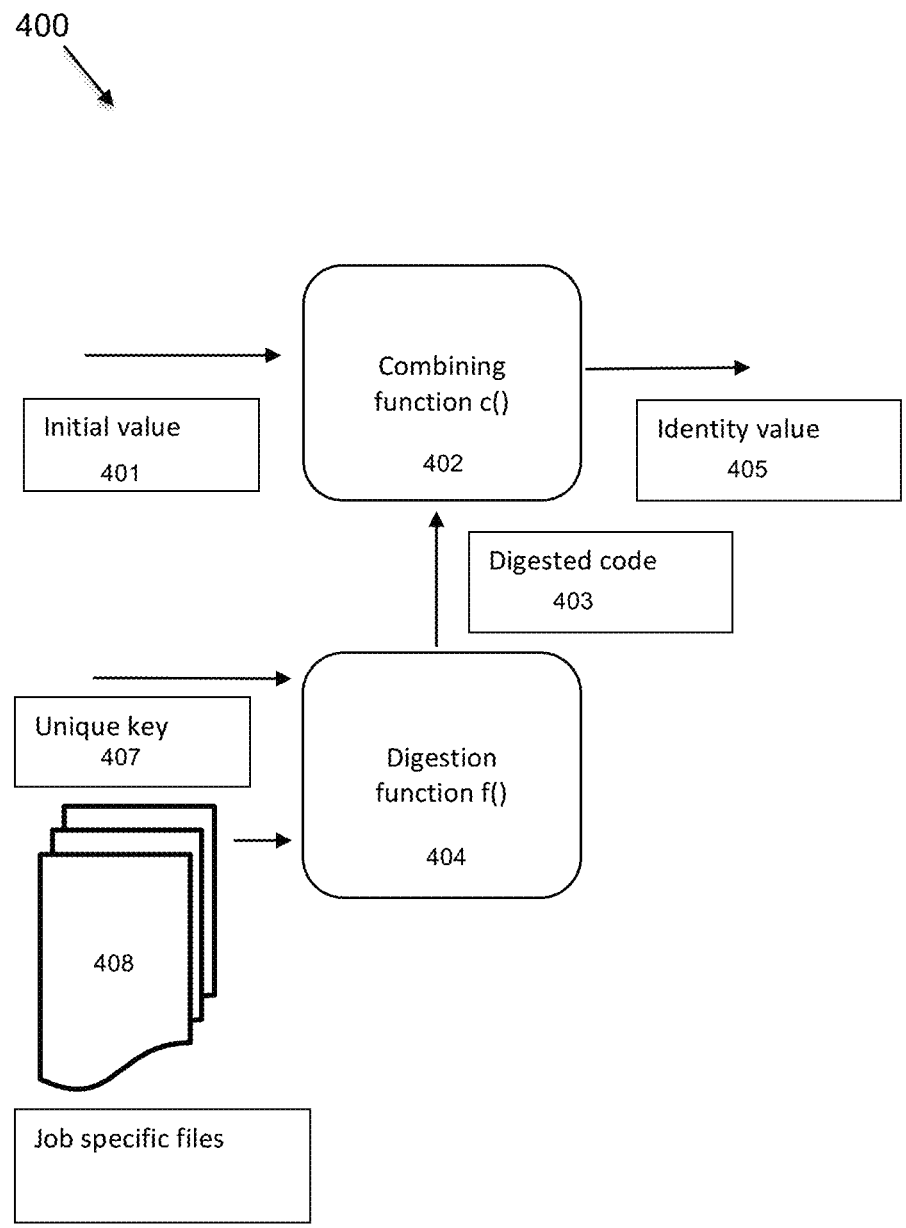
FIG. 4 is a block diagram of the file signing engine, under some embodiments.

FIG. 4 is a block diagram of the file signing engine, under some embodiments. FSE 400 contains a combining function 402 and a digestion function 404. The digestion function 404 takes in the job specific files 408 and a unique key 407 and outputs digested code 403. The combining function 402 takes in the digested code 403 of length of k and an initial value 401, and outputs an identity value 405 as the signature of the digested file or files.

In an embodiment, the digestion function has two main components of process logic. The first one is a component to extract a fixed length code out of a file, and the second one is to mix the unique key with the first logic. This logic is implicit to external parties, and it is a core element of the FSE that prevent attackers from breaching the system. The way to yield the code is through a designed condensation mechanism. There are different ways to implement this logic, as described below, though embodiments are not so limited.

For a file that contains n bits, a linear way of generating k bits out of n bits uses a cyclic redundancy check (CRC) on the n bits to output the k bits. If the size n is not a perfect multiplier of k, there needs to be a padding of the remaining bit to be either 1 or 0. For the CRC, the initial value will be the unique key. The sequence of computing this CRC is not limited to forward or backward directions, and the offset of the starting point is bounded by 0 or any number. A non-linear approach, can be done as hash-based message authentication code. Such a code may be expressed as:

$$HMAC(K,m)=H((K'\oplus opad)\|H((K'\oplus ipad)\|m))$$

In the above equation, H is a cryptographic hash function, K is the secret key, m is the message to be authenticated, K' is another secret key derived from the original key K (e.g., by padding K to the right with extra zeroes or by hashing K if it is longer than that block size), $\|$ is a concatenation function, $\oplus$ is an exclusive or (XOR) function, opad is the outer padding, and ipad is the inner padding. In an embodiment of the FSE, K is the unique key and m is the n-bits content. The hash function H can be designed to have a function appropriate for implementation and is not limited to be only SHA or MD5.

Figure 5:
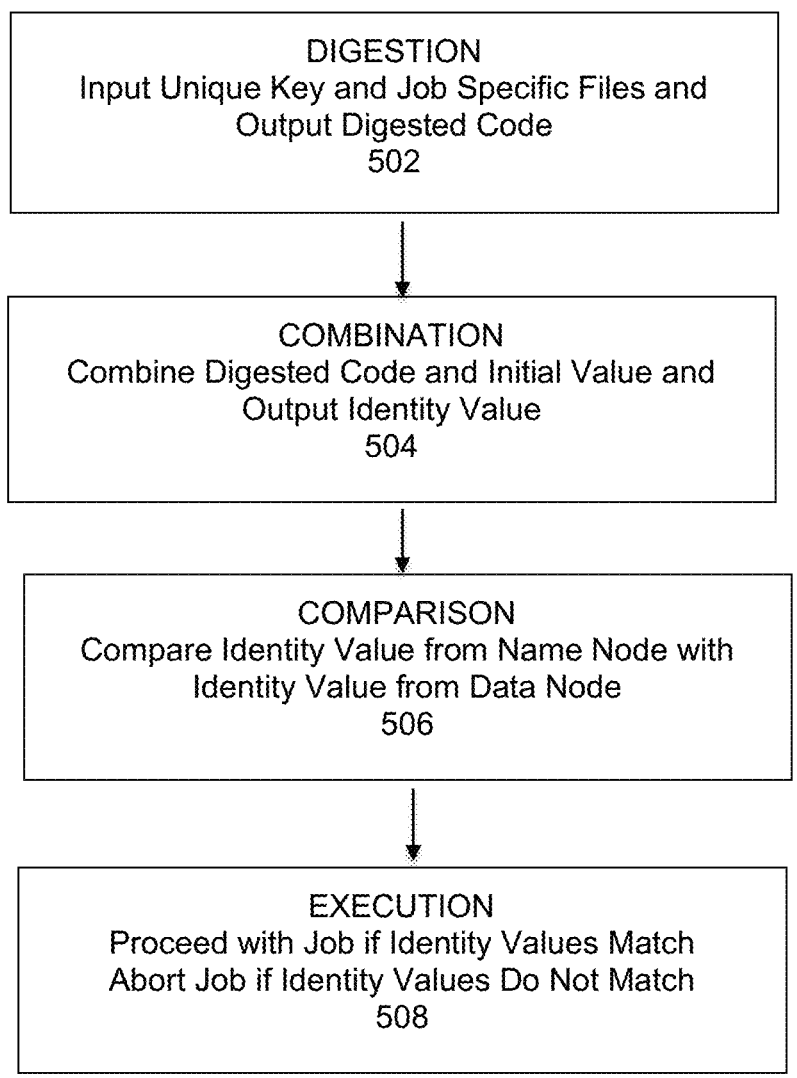
FIG. 5 is a flowchart that illustrates a method of performing file-level content authentication using a file signing engine, under some embodiments.

FIG. 5 is a flowchart that illustrates a method of performing file-level content authentication using a file signing engine, under some embodiments. For flow diagram 500, the digestion 502 and combination 504 steps are performed in a file signing engine that is executed on both a name node and a data node, as shown in FIG. 3. The digestion step 502 comprises inputting the unique key and job specific files into a digestion function 404 to output digested code. In step 504, the combination step combines the digested code and an initial value in a combining function 402 to output an identity value. For the FSE on the name node, the identity value corresponds to ID_V1 shown in FIG. 3, and on the data node, the identity value corresponds to ID_V2. In step 506, a comparison function is performed that compares the identity values from the name node and the data node. The execution function 508 then performs the appropriate action depending on the comparison, namely, proceeding if they match, and aborting if they do not match.

Figure 6:
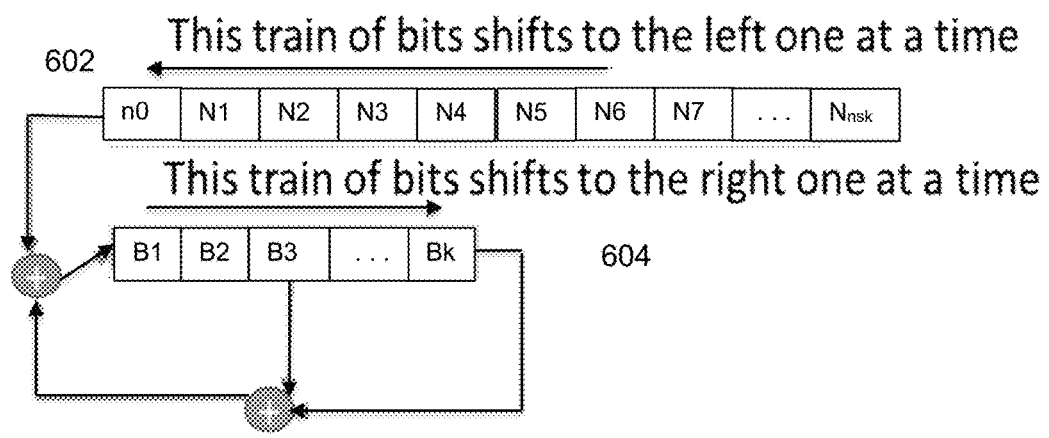
FIG. 6 illustrates a stream combination function that may be used in the combining function, under some embodiments.

In an embodiment, the combining function 402 is similar to the digestion function 404. As stated above, it takes in the digested codes from digestion function and further condenses it to a k bit output as the identity value. The initial value 401 is used in the combining function as well. There are two general modes to construct the combining function. The first mode is to use a block cipher mode, and the second mode is a stream cipher mode. For a stream cipher, the process treats all the digested code as one big chunk at a time, and uses a designed shifting logic to perform operations on a buffer of bitsize k. The logic gets executed n by k times, where n is number of the digested codes and k is size of digested code in bits, and on the last stage whatever value is held in the buffer is the identity value. The initial state of the buffer is filled by the initial value 401. FIG. 6 illustrates a stream combination function may be used in the combining function, under some embodiments. As shown in FIG. 6, a first train 602 of bits denoted $n_0, N_1, N_2, \ldots, N_{n \times k}$ is shifted to the left one bit at a time. The shifted bits are input to an adder and combined in train 604 where the train of bits denoted $B_1, B_2, \ldots, B_k$ are shifted to the right one bit at a time.

Figure 7:
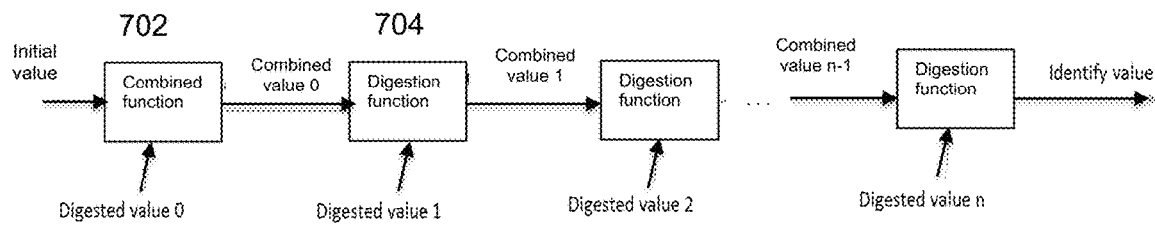
FIG. 7 illustrates an example cipher block chaining that may be used with a combining function, under some embodiments.

For the block cipher mode, the block size in this case is k. If there are n files, then the process will be carried for n iterations if the system uses a chain as the hierarchy. The hierarchy is not limited to a list, and can also be a more general tree structure. The combining logic is to use the previous output of the digestion function as the new input for the next round of combining logic. In this manner, the combining function generically takes only one digestion code and one initial value at the very first time. For the later iterations, the inputs are the current digested code and the previously combined value. FIG. 7 illustrates an example cipher block chaining that may be used with a combining function, under some embodiments. As shown in FIG. 7, an initial value is input to combining function 702 which is combined with a digested value to produce a combined value 0, which is then input to a digestion function 704 and combined with a digested value 1 to produce a combined value 1, and so on until a last digestion function combines a combined value n−1 with a digested value n to produce an identified value. In implementation, the logic may be more complex in term of hierarchy, so that it is more resilient for counter attack. The output of the combining function is the output from the combining function at the last iteration, n.

Figure 8:
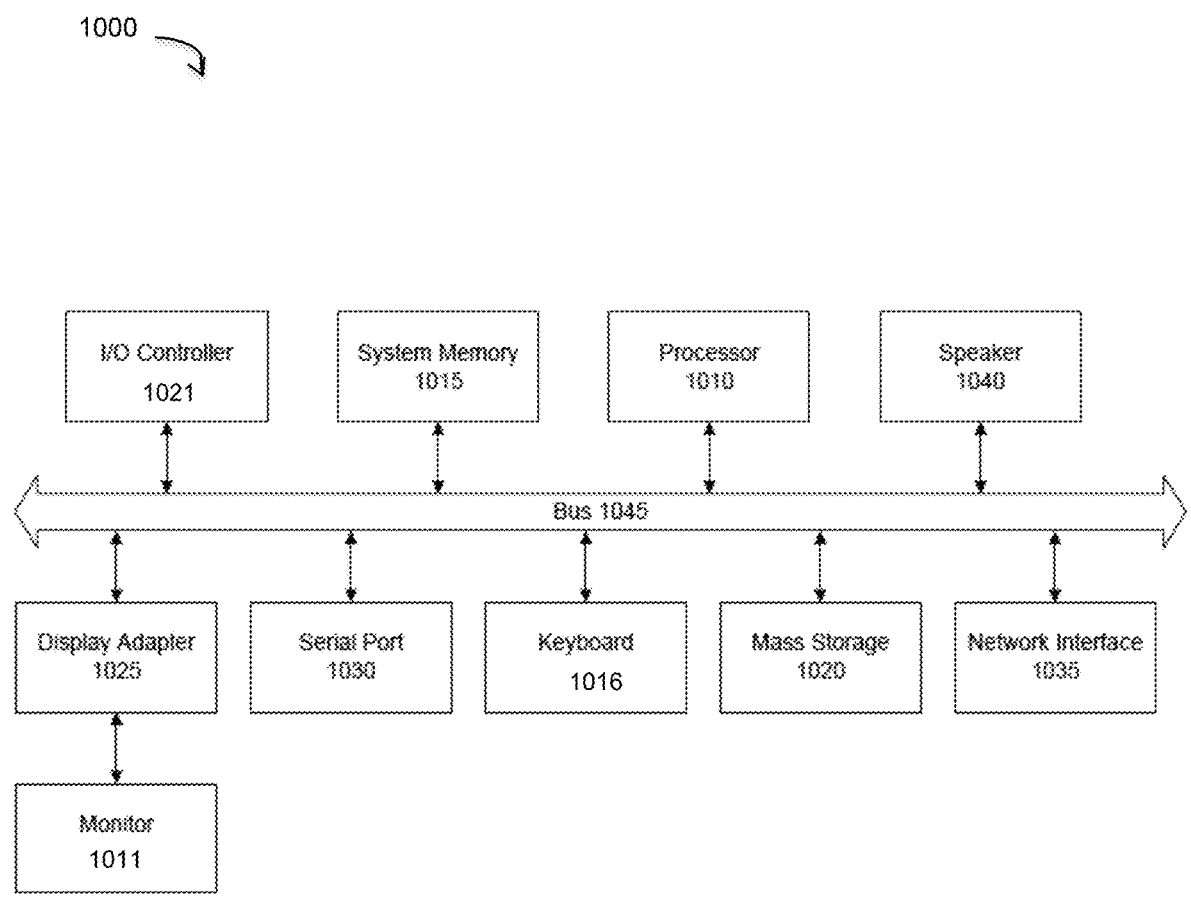
FIG. 8 is a block diagram of a computer system used to execute one or more software components of a HDFS authentication system, under some embodiments.

As described above, in an embodiment, system 100 includes a file signing engine component or module for HDFS containers that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 8 is a block diagram of a computer system used to execute one or more software components of a file signing engine, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing content authentication of data in a network having a name node and a data node, comprising:
generating, by a first processing engine on the name node, a first identity value for the content through job specific files and encryption elements;
generating, by a second processing engine on the data node, a second identity value for the content through the job specific files and encryption elements;
associating each data set of the data with a first key identifying a job owner issuing a task for the data set, the first key being a session key that is randomly generated for the task;
and
performing the task if the first identity value matches the second identity value.

2. The method of claim 1 further comprising: packaging the data sets in job specific files into execution containers in a Hadoop Distributed File System (HDFS) network cluster.

3. The method of claim 1 wherein the encryption elements comprise a unique key and an initial value.

4. The method of claim 3, wherein the unique key comprises a value indicating an identity of a job owner issuing the task, and wherein the initial value comprises a unique session key that is randomly generated for the task.

5. The method of claim 4 further comprising, for each of the first and second processing engines, inputting the job specific files and the unique key into a digestion function to generate digested code, wherein the digestion function comprises a cryptographic hash function.

6. The method of claim 5 wherein the first processing engine comprises a first file signing engine and the second processing engine comprises a second file signing engine, the method further comprising, for each of the first and second file signing engine components, inputting the digested code and the initial value into a combining function to generate a respective identity value of the first and second identity values.

7. The method of claim 6 wherein each of the unique key, initial value, and digested code are of a bit length, k.

8. The method of claim 1 wherein the data node comprises a plurality of data nodes, and wherein the job containers are spread across the plurality of data nodes for execution of the task processing the content.

9. A system of providing content authentication of data in a network having a name node and a data node, comprising:
   first hardware processing means of the name node generating a first identity value for the content through job specific files and encryption elements;
   second hardware processing means of the data node generating a second identity value for the content through the job specific files and encryption elements;
   third hardware processing means associating each data set of the data with a first key identifying a job owner issuing a task for the data set, the first key being a session key that is randomly generated for the task, and performing the task if the first identity value matches the second identity value, wherein the hardware processing means comprise at least a processor and a memory.

10. The system of claim 9 further comprising: a component packaging the data sets in job specific files into execution containers in a Hadoop Distributed File System (HDFS) network cluster.

11. The system of claim 9 wherein the encryption elements comprise a unique key and an initial value.

12. The system of claim 11 wherein the unique key comprises a value indicating an identity of a job owner issuing the task, and wherein the initial value comprises a unique session key that is randomly generated for the task.

13. The system of claim 11 wherein each of the unique key, initial value, and first and second digested codes are of a bit length, k.

14. The system of claim 9 wherein the first hardware processing means comprises:
   a first digestion function receiving the unique key and the job specific files to generate first digested code; and
   a first combining function receiving the initial value and the first digested code to generate the first identity value for the name node.

15. The system of claim 14 wherein each of the first and second hardware processing means comprises a cryptographic hash function.

16. The system of claim 9 wherein the second hardware processing means comprises:
   a second digestion function receiving the unique key and the job specific files to generate second digested code; and
   a second combining function receiving the initial value and the second digested code to generate the second identity value for the data node.

17. The system of claim 9 wherein the data node comprises a plurality of data nodes, and wherein the job containers are spread across the plurality of data nodes for execution of the task processing the content.

18. A computer program product, comprising a non-transitory computer-readable medium having a computer-readable program code embodied therein, the computer-readable program code adapted to be executed by one or more processors to perform a method of providing content authentication of data in a network having a name node and a data node, comprising:
   generating, by a first processing engine on the name node, a first identity value for the content through job specific files and encryption elements;
   generating, by a second processing engine on the data node, a second identity value for the content through the job specific files and encryption elements;
   associating each data set of the data with a first key identifying a job owner issuing a task for the data set, the first key being a session key that is randomly generated for the task;
   and
   performing the task if the first identity value matches the second identity value.

* * * * *